United States Patent
Melvin, III et al.

(10) Patent No.: US 11,741,287 B1
(45) Date of Patent: Aug. 29, 2023

(54) PRIORITIZED MASK CORRECTION

(71) Applicant: Synopsys, Inc., Mountain View, CA (US)

(72) Inventors: Lawrence S. Melvin, III, Hillsboro, OR (US); Frank L. Ferschweiler, Portland, OR (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 17/370,990

(22) Filed: Jul. 8, 2021

Related U.S. Application Data

(62) Division of application No. 16/583,001, filed on Sep. 25, 2019, now Pat. No. 11,093,680.

(Continued)

(51) Int. Cl.
*G06F 30/392* (2020.01)
*G06F 119/18* (2020.01)
*G06F 111/02* (2020.01)

(52) U.S. Cl.
CPC ........ *G06F 30/392* (2020.01); *G06F 2111/02* (2020.01); *G06F 2119/18* (2020.01)

(58) Field of Classification Search
CPC .... G06F 30/398; G06F 30/39; G06F 2119/18; G06F 30/20; G06F 30/30; G06F 30/392; G06F 30/00; G06F 2119/12; G06F 30/33; G06F 2111/04; G06F 2111/08; G06F 30/367; G06F 30/394; G06F 2119/06; G06F 30/333; G06F 16/164; G06F 16/1744; G06F 16/2462; G06F 17/175; G06F 2119/02; G06F 30/18; G06F 30/27; G06F 30/34;

(Continued)

(56) References Cited

U.S. PATENT DOCUMENTS 6,703,167 B2    3/2004   LaCour
7,069,535 B2    6/2006   Kobozeva et al.
(Continued)

OTHER PUBLICATIONS

Geissler et al., "Patterning: Principles and some new developments," Advanced Materials 16, No. 15, Aug. 4, 2004, pp. 1249-1269.
Domnenko et al., "OPC verification on cell level using fully rigorous mask topography simulation," Conference paper in International Society for Optical Engineering, Oct. 2007, 10 pages.
(Continued)

*Primary Examiner* — Binh C Tat
(74) *Attorney, Agent, or Firm* — Haynes Beffel & Wolfeld LLP; Andrew L. Dunlap

(57) ABSTRACT

The independent claims of this patent signify a concise description of embodiments. Roughly described, a design team prioritizes polygons of a circuit design layout. This information is then encoded into a layout database that is passed to the manufacturing team for correction further processing toward tape-out. The priorities may be used by an engineer to disposition errors found in the layout. For example, a failure may be waived. In another embodiment, the priorities are used during hotspot fixing, a process where failed features are corrected. In hotspot fixing, the priority can be used to make correction tradeoffs in favor of the highest priority features. Priorities are set during the correction to favor fidelity of the higher priority features over the lower priority features. Each embodiment reduces cost, and in some cases, improve final device performance. This Abstract is not intended to limit the scope of the claims.

20 Claims, 7 Drawing Sheets

Related U.S. Application Data

(60) Provisional application No. 62/736,071, filed on Sep. 25, 2018.

(58) Field of Classification Search
CPC ........ G06F 30/36; G06F 7/5443; G06F 1/324; G06F 2111/02; G06F 2111/10; G06F 2111/20; G06F 3/04815; G06F 3/04847; G06F 30/327; G06F 30/331; G06F 30/337; G06F 18/22; G06F 18/24; G06F 2119/22; G03F 1/36; G03F 1/70; G03F 1/84; G03F 7/70441; G03F 7/705; G03F 1/38; G03F 1/26; G03F 1/68; G03F 7/70433; G03F 7/70625; G03F 1/78; G03F 1/82; G03F 7/2004; G03F 7/70125; G03F 7/70425; G03F 7/70466; G03F 7/70591; G03F 7/70616; G03F 7/70633; G03F 7/7085; G03F 1/76; G03F 7/0002; G03F 7/70525; G03F 7/7065; G03F 7/70508; G03F 1/44; G03F 7/70475; H01L 27/0207; H01L 27/0688; H01L 2224/05569; H01L 22/12; H01L 21/67005
USPC .................................................. 716/118–125
See application file for complete search history.

(56) References Cited

U.S. PATENT DOCUMENTS

| | | | |
|---|---|---|---|
| 7,240,305 B2 | 7/2007 | Lippincott | |
| 7,249,342 B2 | 7/2007 | Pack et al. | |
| 7,966,585 B2 | 6/2011 | Park | |
| 2002/0166109 A1* | 11/2002 | Rittman | G06F 30/398 |
| | | | 257/734 |
| 2009/0278569 A1* | 11/2009 | Taoka | H03K 19/094 |
| | | | 430/30 |
| 2011/0318672 A1 | 12/2011 | Ogadhoh et al. | |
| 2015/0363536 A1 | 12/2015 | Chidambarrao et al. | |
| 2019/0072845 A1* | 3/2019 | Lin | G03F 1/70 |

OTHER PUBLICATIONS

Proteus LRC—Full-Chip Verification Through Process Window, Synopsys, Inc., 2016, 3 pages.
Proteus Inverse Lithography Technology (ILT)—Advanced Correction of Optical Proximity Effects, Synopsys, Inc., 2018, 3 pages.
Juspertor GmbH, LayoutEditor Documentation, Chapter I, GDSII Format, available at http://boolean.klaasholwerda.nl/interface/bnf/gdsformat.html#rec_header, visited Sep. 18, 2019, 15 pages.
IC Validator Physical Verification—High-performance physical verification solution delivers up to 2X faster physical signoff, Synopsys, Inc., 2019, 8 pages.

* cited by examiner

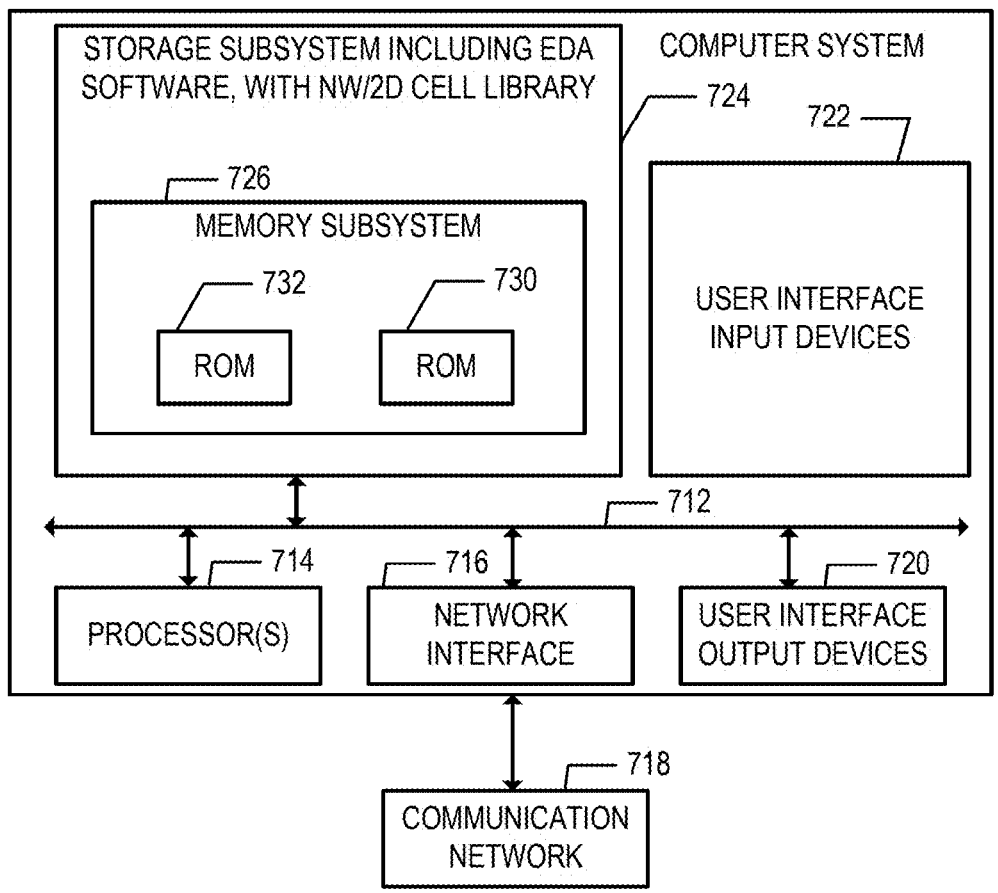
FIG. 7A
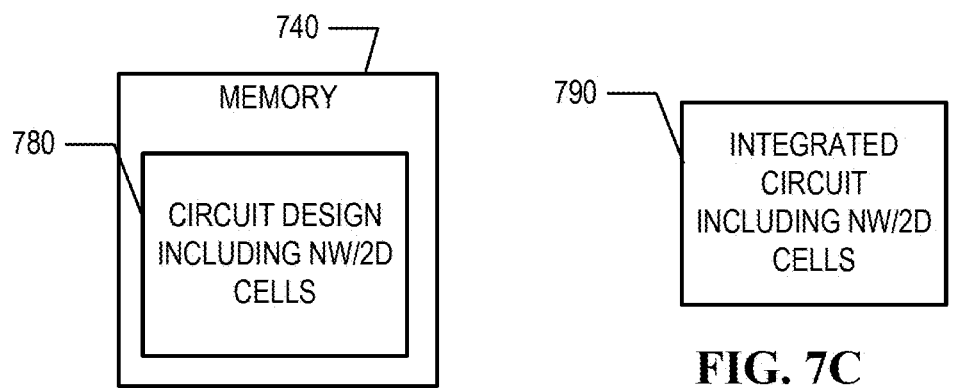
FIG. 7B
FIG. 7C

PRIORITIZED MASK CORRECTION

CROSS-REFERENCE TO OTHER APPLICATIONS

This application is a divisional of U.S. patent application Ser. No. 16/583,001 filed Sep. 25, 2019, which claims priority under 35 U.S.C. § 119(e) to U.S. Provisional Application No. 62/736,071, filed on Sep. 25, 2018, the entire contents of each are incorporated herein in their entireties.

FIELD OF THE INVENTION

This invention relates to the development of advanced integrated circuit devices using computer-aided design (CAD) and electronic design automation (EDA) systems, and more specifically to techniques for improving the translation of circuit designs to masks for fabrication of such devices.

COPYRIGHT NOTICE

The assignee of this patent document has no objection to the facsimile reproduction by anyone of the patent document itself, or of the patent application, as it appears in the files of the United States Patent and Trademark Office, but otherwise reserves all rights whatsoever in any included works of authorship protected by copyright.

DISCLAIMER

In the following Background, Summary, and Detailed Description, headings should not be construed as necessarily limiting. In the following Background, Summary and Detailed Description, the citation or identification of any publication does not signify relevance or status as prior art for any of the claimed or described embodiments.

BACKGROUND

After almost 50 years of semiconductor manufacturing, interactions between a design team and a production team are largely the same as they have been for at least the last 20 years. Roughly, the process team tells the design team what the process will support in terms of features, and the design requests modifications to permit greater flexibility during design, until an equilibrium weighted towards the process is found. The results of this interaction are codified into design rules that define the limits for all designs to be fabricated using the fabrication process. A virtual wall is formed between the design and manufacturing teams through which very little communication occurs during the execution (design and manufacture) of a process node.

Design rules are generally more restrictive than necessary. This is done to guard against unknowns, process variations, and noise. It is also done because design rules are generally developed before the manufacturing process is final, so the process development team further restricts the design rules as protection against further tweaks that have to be made to the process before it becomes final. The result is that the final device performance is limited by the restrictive design rules both in electrical characteristics and in layout area that may not be necessary in many cases.

It is desirable to provide ways to improve final device performance where possible.

SUMMARY

The claims signify a brief description of one or more of the innovations, embodiments, and/or examples found within this disclosure.

This Summary does not attempt to completely signify any particular innovation, embodiment, or example as it can be used in commerce. Additionally, this Summary is not intended to signify essential elements of an innovation, embodiment or example or to limit the scope of the subject matter of this disclosure.

The innovations, embodiments, and/or examples found within this disclosure are not all-inclusive, but rather describe the basic significance of the subject matter. Accordingly, one use of this Summary is as a prelude to a Detailed Description presented later.

One of the ways in which performance of an integrated circuit design can be limited unnecessarily is by the communication barrier that often exists between the design team and the manufacturing team, the team that moves the design from layout to tape-out for fabrication. In particular, the manufacturing team typically treats all patterns drawn on a circuit layout as equally important outside of minor deviations such as fill patterns. This means the process team may correct problems by optimizing the shape of a low importance ground wire at the expense of a high importance timing circuit. Effectively, the critical timing circuit performance in this example could be degraded to improve the performance of a less important circuit element because the manufacturing team has no understanding of the polygon or its importance to the circuit. This lack of communication often leads to poor decisions that may impact device performance and process yield thereby increase device cost.

Roughly described, a system and a method are provided that can be used to communicate certain design information to the manufacturing team so that it can be used to help guide disposition of manufacturing risks that arise from the optical proximity correction (OPC) step. Once a disposition and information handling standard is in place, the information can be used to help prioritization in OPC/ILT or other mask treatments.

In one embodiment, the design team initially marks each of a plurality of feature of a layout with a priority value. For example, a priority value of 1 may indicate the highest priority whereas a priority value of 100 may indicate the lowest priority. The priority may indicate the design team's view of the relative importance that the feature as ultimately fabricated on the chip has the same shape as indicated in the original layout.

The prioritization information is encoded into the layout database that then passes through all mask synthesis processes, including OPC and LRC (Lithography Rule Checking), so that it appears perceptibly to a user viewing the errors found by the LRC tool. The user can then use these designer-identified prioritizations in order to prioritize revisions to be made to the OPC-corrected layout database in order to address the LRC errors. For example, the user may choose to waive an error because the priority is low and the error is minor, have a region of the layout revised in a manner that prioritizes one features correction over another feature correction that has a lower design priority, or mandate the need for a fix because the design priority is high or some other information based choice.

One or more embodiments of the invention or elements thereof can be implemented in the form of a computer product including a non-transitory computer readable storage medium with computer usable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a computer readable storage medium (or multiple such media).

These and other features, aspects, and advantages of the invention will become apparent from the following detailed description of illustrative embodiments thereof, which is to be read in connection with the accompanying drawings.

BRIEF DESCRIPTION OF THE DRAWINGS

The invention will be described with respect to specific embodiments thereof, and reference will be made to the drawings.

In the Figures, similar components or features may have the same, or similar, reference signs in the form of labels (such as alphanumeric symbols, e.g., reference numerals), and may signify similar or equivalent functionality. Further, various components of the same type may be distinguished by following the reference label by a dash and a second label that distinguishes among the similar components. If only the first reference label is used in the specification, the description is applicable to any one of the similar components having the same first reference label irrespective of the second reference label. A brief description of the Figures is below.

FIGS. 7A, 7B and 7C (collectively FIG. 7) depict simplified block diagrams of a computer system suitable for use with embodiments of the technology, as well as circuit design and circuit embodiments of the technology.

Figure 1:
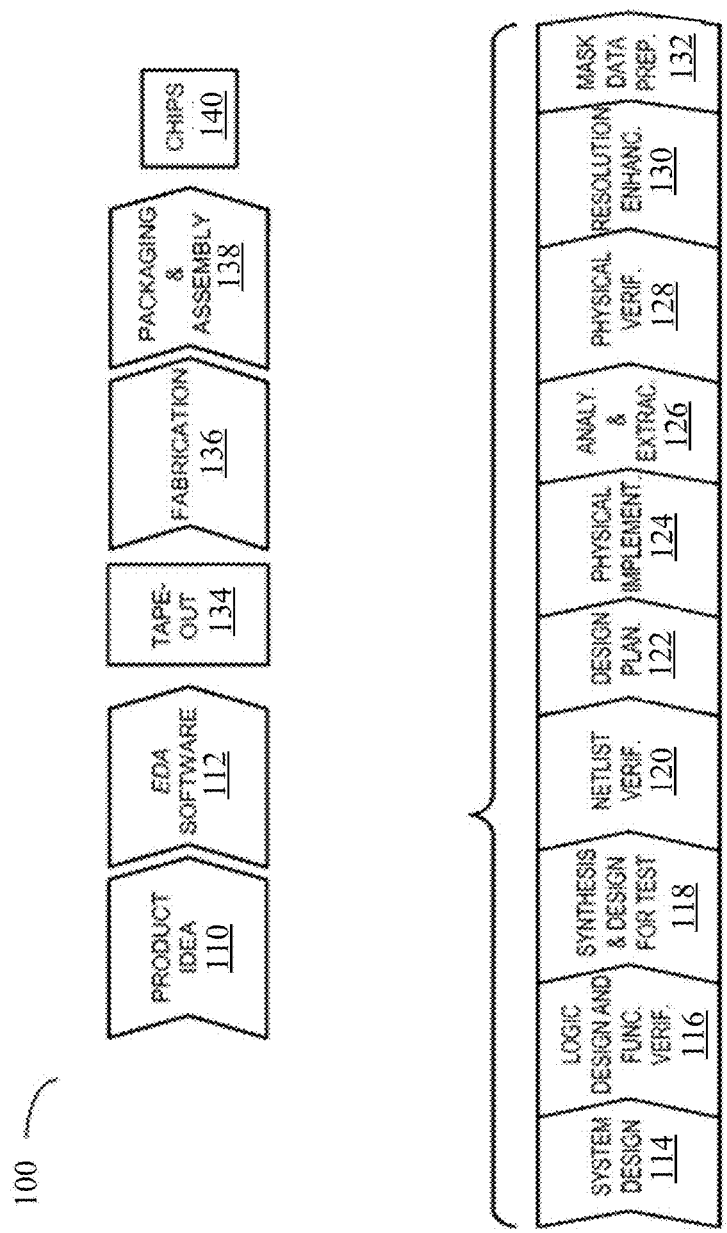
FIG. 1 depicts a flowchart of various operations in the design and fabrication of an integrated circuit in accordance with an embodiment of the present disclosure.

In such various figures, reference signs may be omitted as is consistent with accepted engineering practice; however, one of ordinary skill in the art will understand that the illustrated components are readily understood when viewed in context of the illustration as a whole and the accompanying disclosure describing such various figures.

DETAILED DESCRIPTION

The following Detailed Description, Figures and Claims signify the nature and advantages of the innovations, embodiments and/or examples of the claimed inventions. All of the Figures signify innovations, embodiments, and/or examples of the claimed inventions for purposes of illustration only and do not limit the scope of the claimed inventions. Such Figures are not necessarily drawn to scale, and are part of the Disclosure.

The Figures and the following Detailed Description signify innovations, embodiments and/or examples by way of illustration only, with various features, structures or characteristics described together in a single embodiment to streamline the disclosure. Variations of any of the elements, processes, machines, systems, manufactures or compositions disclosed by such exemplary innovations, embodiments and/or examples will be readily recognized and may be used in commerce without departing from the principles of what is claimed. The Figures and Detailed Description may also signify, implicitly or explicitly, advantages and improvements of a subset of the exemplary embodiments described herein.

In the Figures and Detailed Description, numerous specific details may be described to enable one or more of the exemplary innovations, embodiments and/or examples. In the interest of not obscuring the presentation of the exemplary innovations, embodiments and/or examples in the following Detailed Description, some processing steps or operations that are known in the art may be combined together for presentation and for illustration purposes and might not be described in detail. However, a person skilled in the art will recognize that these exemplary innovations, embodiments and/or examples may be used in commerce without these specific details or with equivalents thereof. In other instances, well-known processes and devices are not described in detail as not to unnecessarily obscure aspects of these exemplary innovations, embodiments and/or examples. In other instances, some processing steps or operations that are known in the art may not be described at all. Instead, the following description is focused on the distinctive features or elements of various exemplary innovations, embodiments and/or examples. Furthermore, while this description may refer to some components of the structure in the singular tense, more than one component may be depicted throughout the Figures and like components are labeled with like numerals.

The following acronyms are used in this document. They are listed in no particular order:

| | |
|---|---|
| DRC | Design Rule Check |
| ICV | IC Validator (Synopsys ® Product) |
| OPC | Optical Proximity Correction |
| LRC | Lithography Rule Check |
| PLRC | Proteus ® Lithography Rule Check (Synopsys Product) |
| EAM | Error Analysis Module |
| PEAM | Proteus Error Analysis Module (Synopsys Product) |
| HSF | Hot Spot Fixing |
| PWB | Proteus Work Bench (Synopsys Product) |
| ILT | Inverse Lithography Technology (Synopsys Product) |
| GUI | Graphical User Interface |

Embodiments of the invention provide a communication path from the design team to the OPC correction team for improving final device performance and reducing manufacturing costs. The design team prioritizes features of the device by assigning a priority value which may, for example, range from 1 to n, where 1 is the highest priority and n is the lowest priority. The features at which prioritizations are assigned can be different of different granularities in different embodiments, or even in a single embodiment. In one embodiment the design team assigns a prioritization only at the polygon level. In another embodiment a prioritization can be assigned to an aspect of a polygon, such as the shape of an end cap of a line. In another embodiment, a prioritization can be assigned to a larger structure such as a full transistor or a full logic gate. Preferably, if a prioritization is assigned to a structure that includes more than one polygon in the layout, the system automatically applies that prioritization to all polygons that make up the structure and allows the design team to adjust the prioritizations of individual ones of the included polygons (or aspects thereof). Cost is reduced using this information during disposition. As used herein, one prioritization is considered "higher" than a second prioritization if the first prioritization is considered more important; even if it is represented with a "lower" prioritization number.

After OPC, the OPC-corrected layout is then analyzed to determine how well the corrected patterns will be manufactured on the wafer. Inevitably, some features will be identified that will have reduced quality (referred to herein as LPC errors). Each of these errors represents a manufacturing risk and may need to be reworked. If the error is found to be small and the design priority is low, the dispositioning engineer can safely waive the error and skip rework, thus saving manufacturing cost.

Device performance and/or yield can be improved with the design data. For example, in the case of a priority 1 feature placed next to a priority 20 feature in standard OPC, both features receive equal treatment, which means any error is shared between the two features. However, when the design prioritization information is present, the high priority feature can be corrected to its optimal state while the low priority feature can take most, or all, of any potential error, as long as the feature still works electrically. A good example is a timing wire placed next to a large capacitor. Small variations in the capacitor will not affect device performance, but variations in the timing wire could impact the device performance and/or yield. If this relative importance is available to the process team, then the process team can apply a correction which sacrifices accuracy of the capacitor in favor of the timing wire.

EDA System/Workflow Explanation

FIG. 1 illustrates various processes typically performed in the design, verification and fabrication of an item of manufacture such as an integrated circuit using software tools with a computer, and possibly special hardware-assisted tools, to transform and verify design data and instructions that represent the integrated circuit. These processes start with the generation of a product idea 110 with information supplied by a designer, information which is transformed during a process to create an item of manufacture (referred to herein as a design or device) that uses an EDA software tool 112, which may also be signified herein as EDA software, as a design tool, or a verification tool. When the design is finalized, it can be taped-out 134, which typically is when artwork (e.g., geometric patterns) for the integrated circuit is sent to a fabrication facility to manufacture the mask set, which is then used to manufacture the integrated circuit. After tape-out, a semiconductor die is fabricated 136 and packaging and assembly processes 138 are performed, which result in the finished integrated circuit 140 which may also be signified herein as a circuit, device, component, chip or SoC (System on Chip).

Items of manufacture, for example, a circuit or system are used in commerce at a variety of levels of abstraction ranging from low-level transistor layouts to high-level description languages. Most designers start at high-level of abstraction to design their circuits and systems, using a hardware description language (HDL) such as VHDL, Verilog, SystemVerilog, SystemC, MyHDL or OpenVera. The high-level HDL is easier for developers to comprehend, especially for a vast system, and may describe highly complex concepts that are difficult to grasp using a lower level of abstraction. The HDL description may be converted into other levels of abstraction as is helpful to the developers. For example, a high-level description may be converted to a logic-level register transfer level (RTL) description, a gate-level (GL) description, a layout-level description, or a mask-level description. Each lower abstraction level introduces more detail into the design description. The lower-levels of abstraction may be generated automatically by computer, derived from a design library, or created by another design automation technique. An example of a specification language at a lower level of abstraction is SPICE, much used detailed descriptions of analog-based circuits.

A design process that uses an EDA software tool 112 includes processes 114-132, which are described below. This design flow description is for illustration purposes only and is not meant to limit the present disclosure. For example, an actual integrated circuit design may require a designer to perform the design operations in a different sequence than the sequence described herein.

During system design 114, a designer describes the functionality to be manufactured. The designer can also perform what-if planning to refine the functionality and to check costs, etc. Hardware-software architecture partitioning can occur at this stage. Exemplary EDA software products from Synopsys, Inc. of Mountain View, Calif., that can be used at this stage include: Model Architect, Saber, System Studio, and Designware products.

During logic design and functional verification 116, modules in the circuit are specified in one or more hardware description languages, or HDLs, and the design in HDL is checked for functional accuracy, that is, to match the requirements of the specification of the circuit or system being designed to ensure that the design produces the correct outputs. Exemplary HDL languages are Verilog, VHDL and SystemC. Functional verification is typically done by using software-based simulators and other tools such as testbench generators, static HDL checking tools and formal verification tools. In some situations, special hardware referred to as 'emulators' or 'prototyping systems' are used to speed up the functional verification. Exemplary EDA software products from Synopsys, Inc. of Mountain View, Calif. that can be used at this stage include: VCS, Vera, Designware, Magellan, Formality, ESP and Leda products. Exemplary emulator and prototyping products also available from Synopsys that can be used at this state include: Zebu.RTM. and Protolink-.RTM. (RTM="Registered Trademark").

During synthesis and design for test 118, HDL code is translated to a netlist. This netlist can be optimized for the target technology. Additionally, tests can be designed and implemented to check the finished integrated circuit. Exemplary EDA software products from Synopsys, Inc. of Mountain View, Calif. that can be used at this stage include: Design Compiler, Physical Compiler, Test Compiler, Power Compiler, FPGA Compiler, Tetramax, and Designware products.

During netlist verification 120, the netlist is checked for compliance with timing constraints and for correspondence with the HDL code. Exemplary EDA software products from Synopsys, Inc. of Mountain View, Calif. that can be used at this stage include: Formality, Primetime, and VCS products.

During design planning 122, an overall floor plan for the integrated circuit is constructed and analyzed for timing and top-level routing. Exemplary EDA software products from Synopsys, Inc. of Mountain View, Calif. that can be used at this stage include: Astro and IC Compiler products.

During layout implementation 124, the physical placement (positioning of circuit elements such as transistors or capacitors) and routing (connection of the same by a plurality of conductors) occurs, as can selection of library cells to perform specific logic functions. Exemplary EDA software products from Synopsys, Inc. of Mountain View, Calif. that can be used at this stage include: the Astro and IC Compiler products.

During analysis and extraction 126, the circuit function is verified at the layout level, which permits refinement of the layout design. Exemplary EDA software products from Synopsys, Inc. of Mountain View, Calif. that can be used at this stage include: Astrorail, Primerail, Primetime, and Star RC/XT products.

During physical verification 128, the layout design is checked to ensure correctness for manufacturing constraints such as DRC constraints, electrical constraints, lithographic constraints, and circuitry function matching the HDL design specification. Exemplary EDA software products from Synopsys, Inc. of Mountain View, Calif. that can be used at this stage include the Hercules product.

During resolution enhancement 130, geometric manipulations of the layout are performed to improve manufacturability of the design. Exemplary EDA software products from Synopsys, Inc. of Mountain View, Calif. that can be used at this stage include: Proteus products.

During tape-out, data is created to be used (after lithographic enhancements are applied if appropriate) for production of lithography masks. Example EDA software products from Synopsys, Inc., that can be used during tape-out include the IC Compiler and Custom Designer families of products.

During mask-data preparation 132, the 'tape-out' data is used to produce lithography masks that are used to produce finished integrated circuits. Exemplary EDA software products from Synopsys, Inc. of Mountain View, Calif. that can be used at this stage include the CATS family of products.

For all of the above mentioned integrated circuit design tools, similar tools from other EDA vendors, such as Cadence, Siemens, other corporate entities or various non-commercial tools from universities, or open source repositories, can be used as an alternative.

Embodiments of the present disclosure can be used during one or more of the above-described stages. Specifically, some embodiments of the present disclosure can be used in EDA software 112.

A storage subsystem is preferably used to store the programs and data structures that provide the functionality of some or all of the EDA tools described herein, and tools applied for development of cells for the library and for physical and logical design using the library. These programs and data structures are generally executed by one or more processors in a manner known to those of ordinary skill in the art.

Most of the steps involved in the aspects of the invention discussed herein occur during the Resolution Enhancement step 130.

Figure 2:
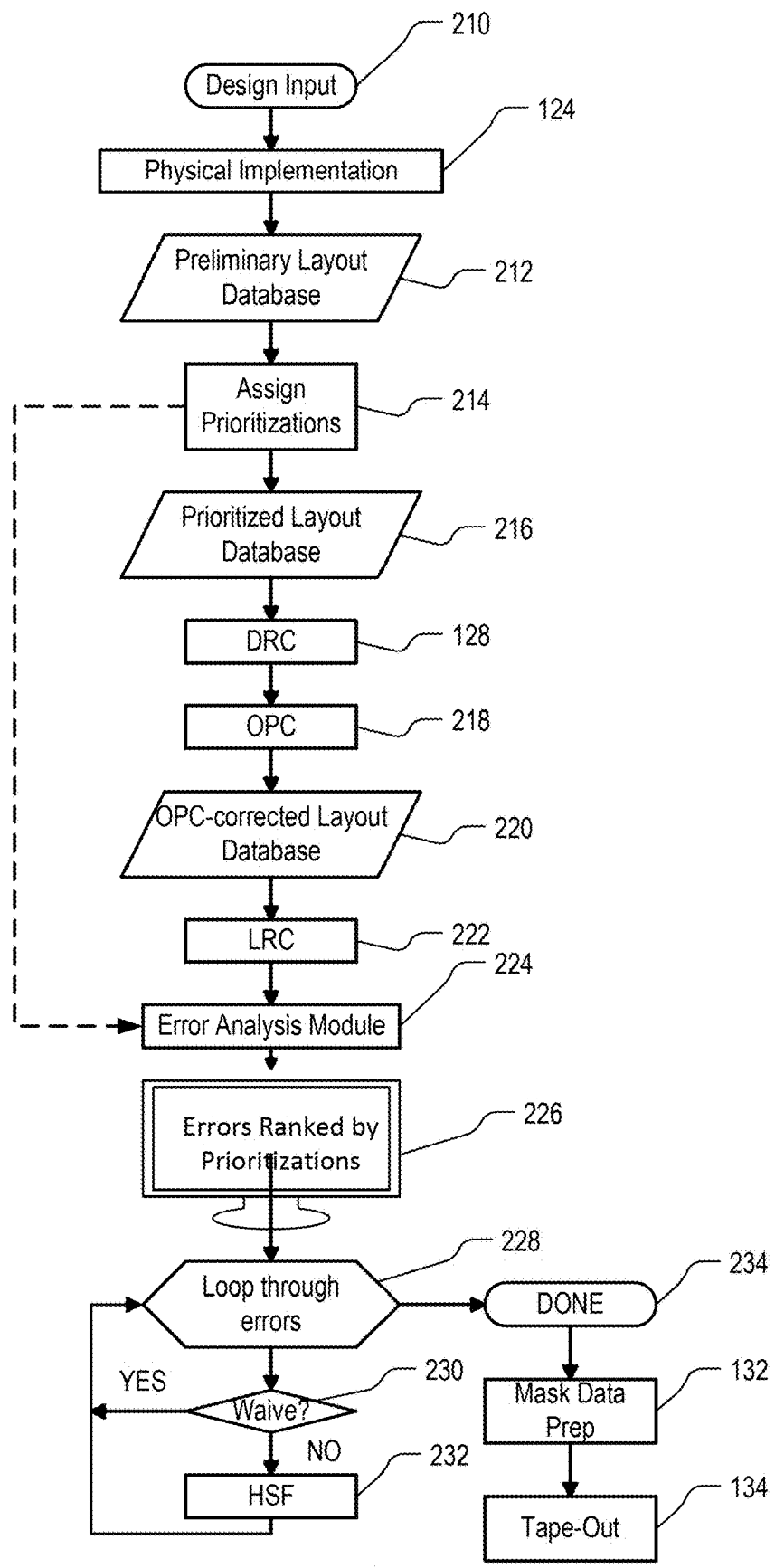
FIGS. 2 and 6 are flow charts illustrating aspects of the invention.

FIG. 2 is a flow chart of a method incorporating aspects of the invention. In step 210, a transistor level circuit design is provided. The design is provided to Physical Implementation step 124 (FIG. 1), which produces a Preliminary Layout Database 212. Layout databases used in the embodiments described herein typically adhere to an industry standard format. Presently the most common of these formats are GDSII and OASIS, but many others have been defined as well and can be used in various embodiments of the invention. These include: Alliance, Bundle, CIF, CSV, DC2-NPGS, DEF, DSN, DWG, DXF, EPS, Eagle, Electromask, Excellon, Gerber, IPC2581, KiCad, LEF, Lasi, MEBES, MacroDump, ODB++, OpenAccess, PS, Rasterformat, SES, SOURCE, SVG, and others. GDSII does not have a single official specification, but the aspects of the specification pertinent to embodiments of the invention as described herein are set forth in Juspertor GmbH, Layout-Editor Documentation, Chapter I, GDSII Format, available at http://boolean.klaasholwerda.nl/interface/bnf/gdsformat.html (visited 2019-09-18), incorporated by reference herein. The OASIS specification is also incorporated herein, and can be found at https://store-us.semi.org/products/p03800-semi-p39-specification-for-oasis%C2%AE-open-artwork-system-interchange-standard (visited 2019-09-19). The present discussion will use the GDSII specification for illustrative purposes, but it will be understood that other file formats can be used for the layout databases herein. I will also be understood that the layout file format used at one step in the method may differ from the format used at a different step in the method.

In the GDSII file format, a layout is represented primarily as planar geometric shapes (polygons), and assigned certain numerical attributes to them including a layer number and a datatype. The layer number indicates on which mask layer the polygon is to be printed on (e.g. implants masks or metal layer masks). The datatype field is discussed below. There is no indication in the native file format of where each polygon came from, what its purpose is (other than the layer number identification), whether it is part of a larger structure, or how important it is to be reproduced faithfully on the chip.

In step 214, the design team assigns prioritizations to the polygons on the design and develops a version of the layout database referred to herein as a Prioritized Layout Database 216. In the present embodiment the prioritizations are represented by a numeric value in the range of 1 to n, where 1 indicates the highest priority. The larger the number of available prioritizations, the more potential tradeoffs can be made in the correction. The priority can be encoded in a layer, a data type, meta data, or some other devices available to semiconductor pattern layout. In the GDSII file format, for example, the datatype field can be used to identify a priority. Alternatively, if the datatype field is already being used to carry other information in a particular embodiment, that information and the priority can share the datatype field. In one embodiment, half the bit-width of the field can be assigned to carry the priority, while the other half is assigned to carry the other information. In another embodiment, the two types of information can be encoded mathematically within the field. Other embodiments will be apparent to the reader. Embodiments in which more than two types of information are carried in the datatype field also will be apparent to the reader.

In another embodiment, the priority can be encoded in the GDSII file using the Layer field, even if the Layer field for a particular element is already occupied by an indication of which mask layer the element is to be printed on. As one example, otherwise unused layer numbers can be assigned to correspond to specific priorities. To indicate a priority value of 1, the identical structure can be duplicated with a layer value of 51. To indicate a priority value of 10, the identical structure can be duplicated with a layer value of 60. Downstream tools can determine the priority assigned to a polygon by looking for another record which describes the same polygon as the first record except that it identifies a different layer number. Many other techniques will be apparent to the reader for identifying priorities in the layout database.

Other file formats include an explicit metadata field, which an embodiment can use to record a prioritization value.

Prioritization values indicate the importance that the design team places on a particular polygon or other feature being reproduced faithfully on an integrated circuit chip. In an embodiment, each prioritization value can correspond to an accuracy tolerance value. For example, assume the standard layout has a printing accuracy tolerance of ±3 nm in wire width. That is, if the feature on the integrated circuit chip as fabricated (as predicted by LRC) has a wire width that is within ±3 nm of the wire width in the layout file, then the feature is considered to be within tolerance. The highest priority feature might reduce this tolerance to ±1 nm and lowest priority feature might increase this tolerance to ±10 nm. Higher priority features therefore benefit from both correction priority and reduced accuracy. At the same time, low priority features are corrected and evaluated less intensely thereby reducing cost. The prioritization is performed at the time of routing and pattern layout and effectively communicates the importance of each feature to the manufacturing team from the design point of view.

In step 128 the prioritized layout database 216 undergoes DRC, and any required layout corrections are made in order to satisfy the design rules of the target fabrication process. DRC does not in this embodiment consider the prioritizations recorded in the prioritized layout database, and the output layout database retains them.

OPC is performed in step 218. OPC is a photolithography enhancement technique commonly used to compensate for image errors due to diffraction or process effects. It corrects errors either by moving edges or adding extra features to the polygons to pre-compensate for the expected printing errors. OPC tools typically are either rule-based (driven by geometric characteristics of a polygon and its neighbors) or model-based (in which a model is used to simulate what the shapes will be as printed and iteratively optimizes polygon restrictions in order to find the best solution. An example of an OPC tool that can be used in an embodiment of aspects of the invention is Proteus OPC, available from Synopsys, Inc. The output of OPC is an OPC-corrected layout database 220.

The objective of OPC is to reproduce on the semiconductor wafer, as well as possible, the original layout drawn by the designer. This is not always achieved, so the OPC-corrected layout database 220 is next provided to an LRC module 222 to identify regions of the layout, sometimes called "hotspots", in which errors remain. An example of an LRC tool that can be used in an embodiment of the invention is Proteus LRC, available from Synopsys, Inc. Proteus LRC is described in Synopsys, Proteus-LRC, data sheet (2016), incorporated herein by reference. LRC outputs a list of identified errors. This list is then viewed by the manufacturing team in an error analysis module 224, which may be GUI tool such as one based on Proteus Error Analysis Module (PEAM), available from Synopsys, Inc., driving a monitor 226.

Figure 3:
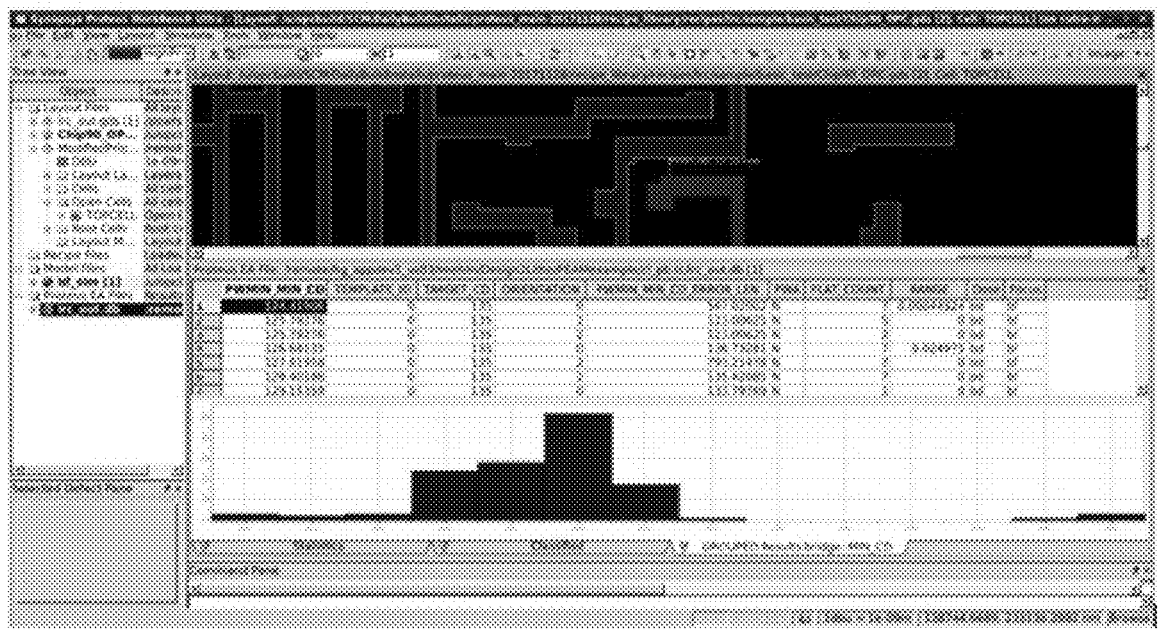
FIG. 3 illustrates a graphical user interface (GUI) for that a user can view using a traditional error analysis module.

Unlike traditional error analysis modules, the analysis module 224 has received a layout database that also includes the design prioritizations assigned in step 214. Error analysis module 224 presents errors resulting from OPC to a user in a manner in which the design prioritizations, for at least a subset of the errors are perceptible to the user. FIG. 3 illustrates a GUI that a user can view using a traditional error analysis module (except that the highlighting of polygons as seen in the upper section of the figure are not highlighted in the traditional error analysis module). As can be seen, seven errors are visible on the one screen, as well as other features such as an enlargement of the layout region having a selected one of the errors, plus a histogram. The errors shown identify the location of the error in the layout, the type of failure (e.g. pinch or bridge), and the magnitude of the failure. There is no information about the importance of the layout features involved in the error.

Figure 4:
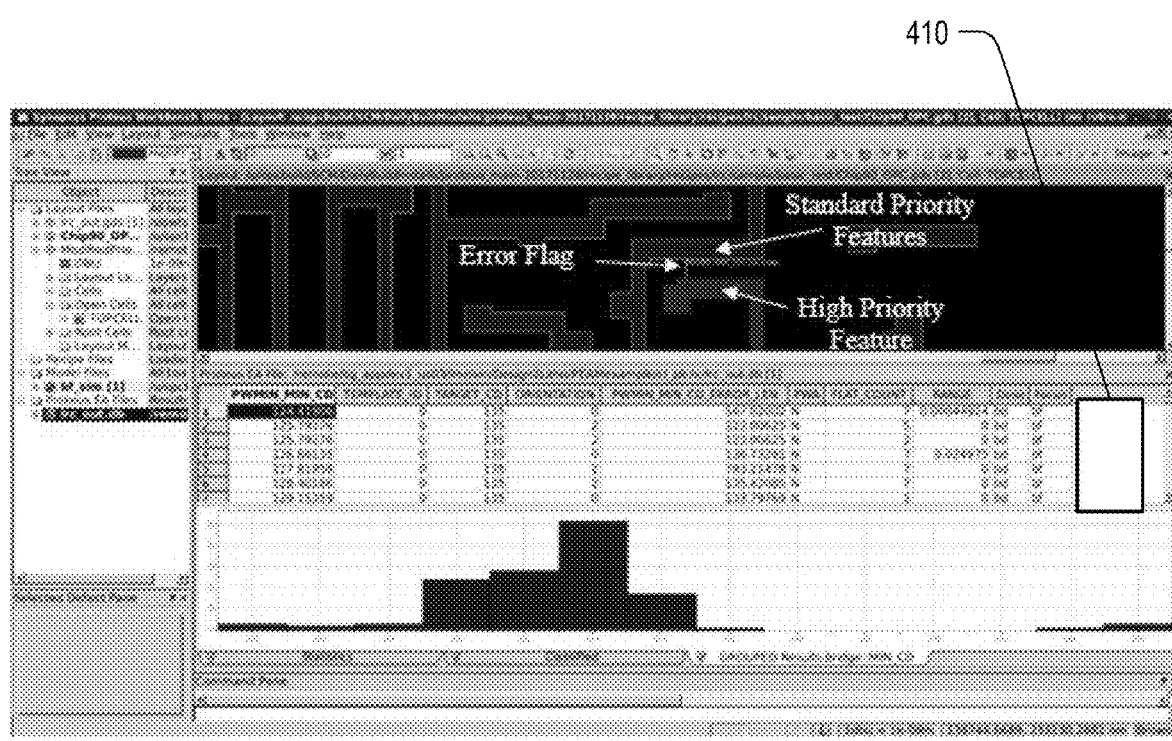
FIG. 4 illustrates the GUI of FIG. 3 modified in accordance with an aspect of the invention.

FIG. 4 illustrates the GUI of FIG. 3 modified in accordance with an aspect of the invention, to also indicate the prioritization of the involved layout features. In particular, a column 410 is added to the error list which indicates the prioritization of the involved polygons from the OPC-corrected layout database 220. If the error involves a single polygon (for example violation of a minimum feature width rule), then the prioritization of indicated in column 410 is the prioritization value of the single polygon. If the error involves a more than one polygon (for example violation of a rule defining the minimum spacing between polygons), then the prioritization of indicated in column 410 is that of the polygon having the highest priority as indicated in the OPT-corrected layout database 220 (though other schemes can be implemented in different embodiments where more than one polygon is involved). The person dispositioning the error can now rapidly see the error and the feature priority and decide how to handle the issue.

In addition, the error analysis module 224 allows the user to sort the errors by the values in column 410, which ranks the errors from highest to lowest priority. The error analysis module 224 also may highlight the involved polygons in different colors in the image of the layout region, depending on polygon prioritization, and may allow the user to zoom in and out to further understand the position of the polygons and the error in the layout. If prioritizations are indicated in GDSII datatype fields, then different datatypes may be set to different colors on the display 226.

Returning to FIG. 2, in step 228 the user loops through the errors identified by the error analysis module 224, or at least those having the highest prioritizations. In step 230 the user can decide to waive an error, in which case the loop continues with another identified error. This can help reduce cost. If the error is not waived, then in one embodiment (not shown), the layout (or just the local region of the layout containing the failure) is returned to OPC module 218 to be re-worked. In the embodiment of FIG. 2, the error undergoes a hot spot fix by an HSF module 232. HSF module 232 takes the local layout region (typically an area in the range of 1-100 square microns), plus a cost function weight for each involved feature that will give priority in correction to one feature over the other feature(s). If feature weights are the same, both features will get the same weight, negating this portion of the cost function influence. In one embodiment, HSF module 232 is Proteus ILT, available from Synopsys, Inc. In another embodiment, HSF module 232 is a version of Proteus OPC which has been modified to respond to such a cost function. To obtain the weights, either a user can enter them manually in dependence upon the relative design prioritizations of the involved polygons, or a table can be used in order to convert the relative design prioritizations into weights automatically. An example of such a table is as follows:

| PRIORITY | WEIGHT | TOLERANCE |
|---|---|---|
| 1 | 100 | ±1 nm |
| 2 | 50 | ±1.5 nm |
| 3 | 10 | ±3 nm (standard tolerance) |
| 4 | 5 | ±3 nm (standard tolerance) |
| 5 | 1 | ±5 nm |
| 6 | 0.5 | ±10 nm |

Also, the feature tolerance can be modified based on priority, although the accuracy numbers typically are developed between the design and manufacturing teams. The above table is completely user defined and could be much larger or smaller in various embodiments.

Figure 5:
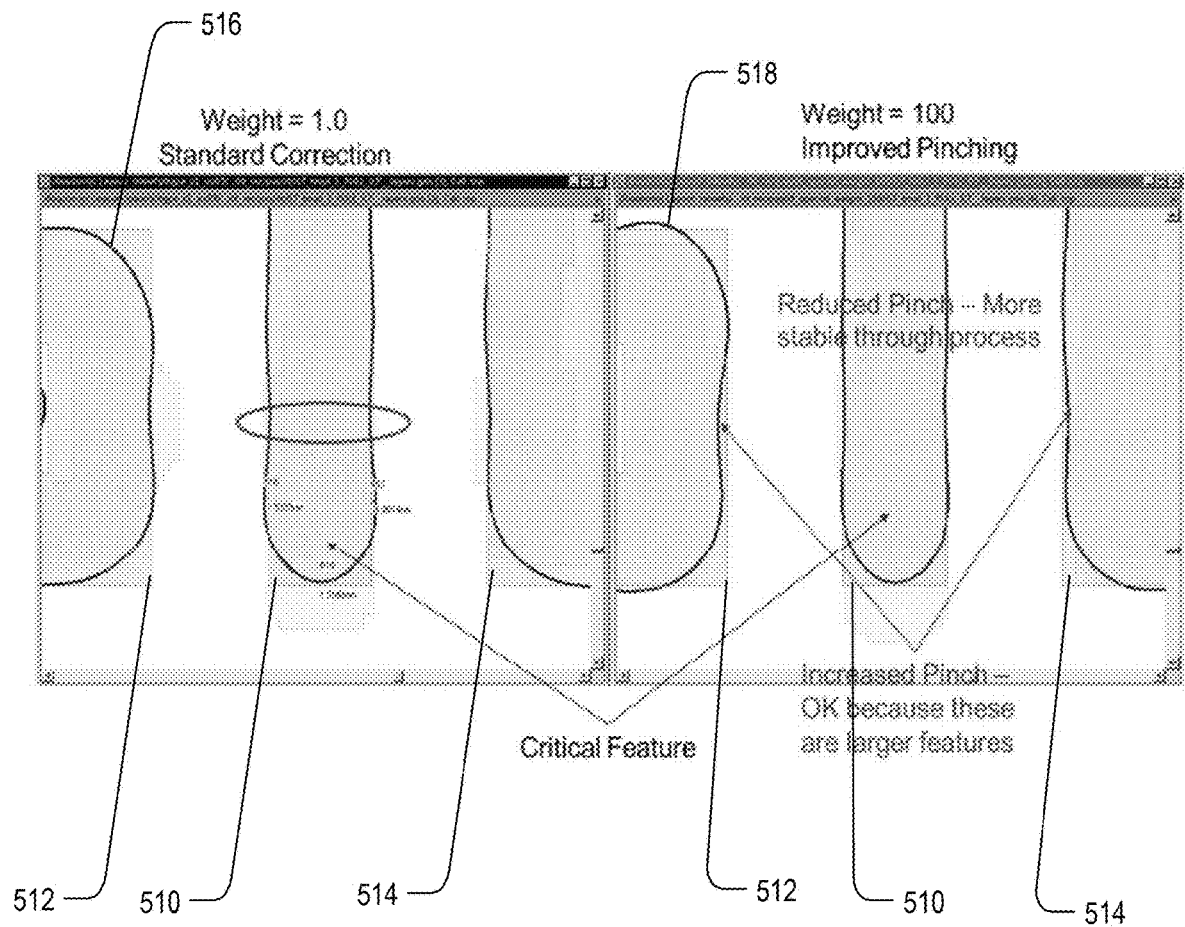
FIG. 5 illustrates a layout pattern corrected with ILT in two different cases of relative prioritizations.

FIG. 5 illustrates a layout pattern corrected with ILT in two different cases of relative prioritizations. The identified failure involves minimum spacing between polygon 510 and two other polygons 512 and 514 to the left and right of polygon 510. Thus four polygon edges are involved: one on each of polygons 512 and 514, and one on each side of polygon 510. The error is to be corrected by pinching the polygons where the spacing is too small. But pinching can have deleterious effects on performance—if introduced in a critical feature.

On the left side of FIG. 5, HSF is performed with equal weights given to all polygon edges is shown by the curved lines 516. It can be seen that the correction shares the pinching equally among the polygon edges on either side of the space. The result is that some pinching remains on the line end on polygon 510.

On the right side of FIG. 5, HSF is performed in response to weights derived from the prioritizations previously assigned by the design team to the polygons. In this case the weight assigned to polygons 512 and 514 are 1.0, but the weight assigned to polygon 510 is 100. It can be seen that after HSF, there is reduced pinch on the edges of polygon 510 at the expense of increased pinch on the edges of polygons 512 and 514. The reduced pinch of polygon 510 helps reduce costs because the shape will be more stable through process, while the increased pinch on polygons 512 and 514 is acceptable because polygons 512 and 514 are larger features.

Returning again to FIG. 2, after an error has been corrected in step 232, the loop continues at step 228 with another identified error. If no further errors are to be corrected, then the loop is done (step 234) and the pipeline continues with mask data preparation 132, tape-out 134, and fabrication 136 (FIG. 1). Note that while the embodiment of FIG. 2 addresses identified errors individually, in another embodiment the system could collect the user's disposition instructions for some or all of the identified errors, and correct them all as a group.

Figure 6:
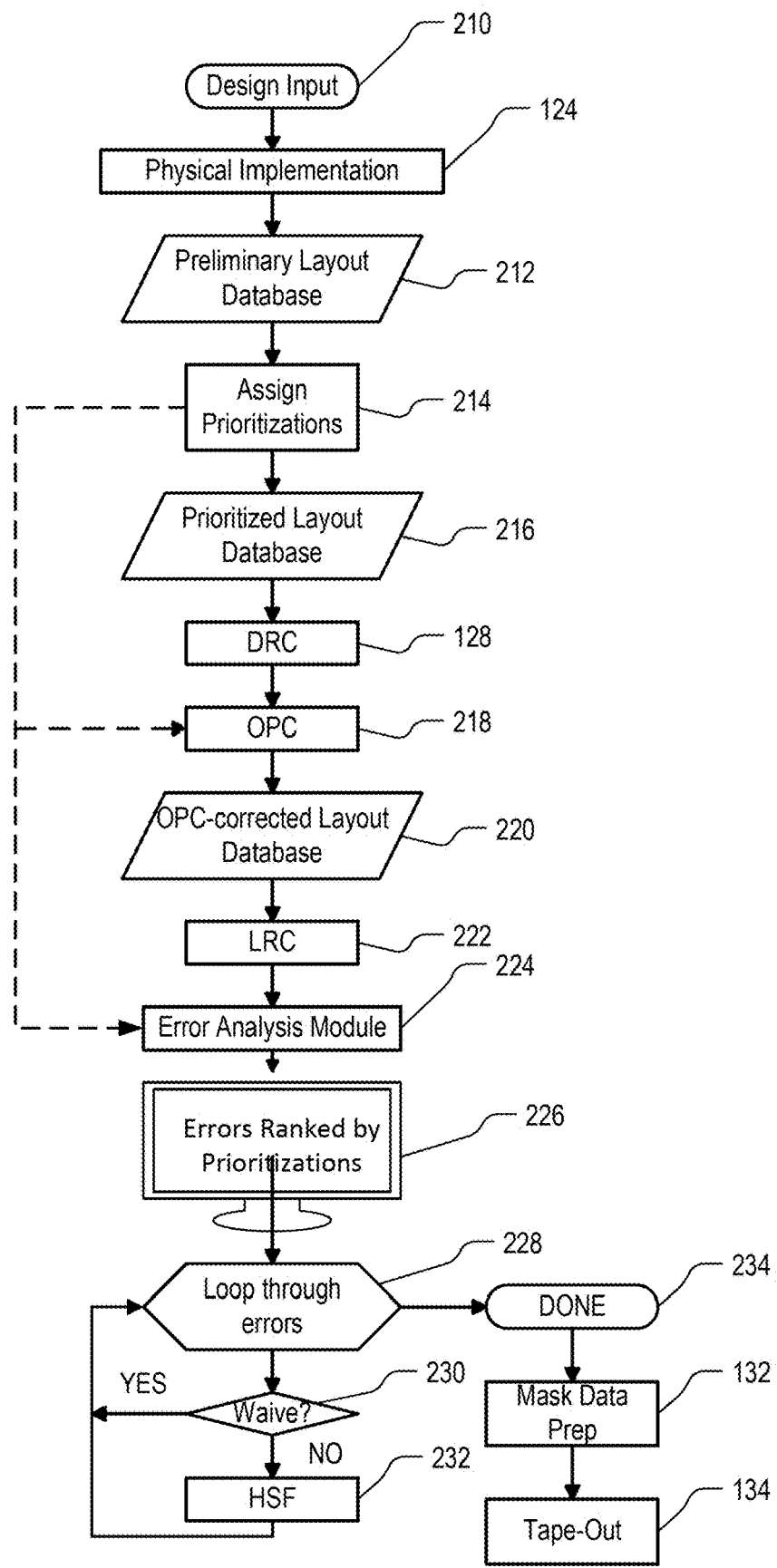

FIG. 2 includes a broken line indicating that the prioritizations assigned in step 214 are used by the error analysis module 224. FIG. 6 illustrates a different embodiment in which the broken line indicates that the prioritizations are also used in the initial OPC step 218. In this embodiment a version of OPC modified to implement a cost function is used in step 218, or ILT may be used. The FIG. 6 embodiment may still result in errors identified in step 222, but most of the errors should already be optimized in accordance with the prioritizations assigned in step 214. The errors are presented to the user by error analysis module 224 and viewed and corrected in the manner set forth above with respect to FIG. 2.

The logic of FIGS. 2 and 6 can be implemented using processors programmed using computer programs stored in memory accessible to the computer systems and executable by the processors, by dedicated logic hardware, including field programmable integrated circuits, or by combinations of dedicated logic hardware and computer programs. Each block in the flowchart describes logic that can be implemented in hardware or in software running on one or more computing processes executing on one or more computer systems. In one embodiment, each step of the flow chart illustrates the function of a separate module of software. In another embodiment, the logic of the step is performed by software code routines which are distributed throughout more than one module. It will be appreciated that many of the steps illustrated in the flow charts can be combined, performed in parallel or performed in a different sequence without affecting the functions achieved. In some cases, as the reader will appreciate, a re-arrangement of steps will achieve the same results only if certain other changes are made as well. In other cases, as the reader will appreciate, a re-arrangement of steps will achieve the same results only if certain conditions are satisfied. Furthermore, it will be appreciated that the flow charts herein show only steps that are pertinent to an understanding of the invention, and it will be understood that in a specific embodiment, numerous additional steps for accomplishing other functions for that embodiment can be performed before, after and between those steps shown.

The layout databases 212, 216 and 220 are stored on one or more non-transitory computer readable media. As used herein, no distinction is intended between whether a database is disposed "on" or "in" a computer readable medium. Additionally, as used herein, the term "database" does not necessarily imply any unity of structure. For example, two or more separate databases, when considered together, still constitute a "database" as that term is used herein. Thus whereas in GDSII implementations the entire layout database may be contained in a single file, in other embodiments the layout database may be spread across more than one file.

As used herein, a given value is "responsive" to a predecessor value if the predecessor value influenced the given value. If there is an intervening processing element or step, the given value can still be "responsive" to the predecessor value. If the intervening processing element or step combines more than one value, the signal output of the processing element or step is considered "responsive" to each of the value inputs. If the given value is the same as the predecessor value, this is merely a degenerate case in which the given value is still considered to be "responsive" to the predecessor value. "Dependency" of a given value upon another value is defined similarly.

As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "indicate" is used herein to mean the same as "identify".

General Computer Explanation

FIGS. 7A, 7B and 7C are simplified block diagrams of a computer system suitable for use with embodiments of the technology, as well as circuit design and circuit embodiments of the technology.

In FIG. 7A, computer system 710 typically includes at least one computer or processor 714 which communicates with a number of peripheral devices via bus subsystem 712. Typically, the computer can include, or the processor can be, any of a microprocessor, graphics processing unit, or digital signal processor, and their electronic processing equivalents, such as an Application Specific Integrated Circuit (ASIC) or Field Programmable Gate Array (FPGA). The terms 'processor' and 'computer' are further defined below. These peripheral devices may include a storage subsystem 724, comprising a memory subsystem 726 and a file storage subsystem 728, user interface input devices 722, user interface output devices 720, and a network interface subsystem 716. The input and output devices allow user interaction with computer system 710.

The computer system may be a server computer, a client computer, a workstation, a mainframe, a personal computer (PC), a tablet PC, a set-top box (STB), a personal digital assistant (PDA), a cellular telephone, a smartphone, a web appliance, a rack-mounted "blade", a kiosk, a television, a game station, a network router, switch or bridge, or any data processing machine capable of executing instructions 124 (sequential or otherwise) that specify actions to be taken by that machine.

The computer system typically includes an operating system, such as Microsoft's Windows, Sun Microsystems's Solaris, Apple Computer's MacOs, Linux or Unix. The computer system also typically can include a Basic Input/Output System (BIOS) and processor firmware. The operating system, BIOS and firmware are used by the processor to control subsystems and interfaces connected to the processor. Typical processors compatible with these operating systems include the Pentium and Itanium from Intel, the Opteron and Athlon from Advanced Micro Devices, and the ARM processor from ARM Holdings.

Innovations, embodiments and/or examples of the claimed inventions are neither limited to conventional computer applications nor the programmable apparatus that run them. For example, the innovations, embodiments and/or examples of what is claimed can include an optical computer, quantum computer, analog computer, or the like. The computer system may be a multi-processor or multi-core system and may use or be implemented in a distributed or remote system. The term 'processor' here is used in the broadest sense to include a singular processor and multi-core or multi-processor arrays, including graphic processing units, digital signal processors, digital processors and combinations of these devices. Further, while only a single computer system or a single machine may be illustrated, the use of a singular form of such terms shall also signify any collection of computer systems or machines that individually or jointly execute instructions 124 to perform any one or more of the sets of instructions discussed herein. Due to the ever-changing nature of computers and networks, the description of computer system 710 depicted in FIG. 7A is intended only as one example for purposes of illustrating the preferred embodiments. Many other configurations of computer system 710 are possible having more or less components than the computer system depicted in FIG. 7A.

Network interface subsystem 716 provides an interface to outside networks, including an interface to communication network 718, and is coupled via communication network 718 to corresponding interface devices in other computer systems or machines. Communication network 718 may comprise many interconnected computer systems, machines and communication links. These communication links may be wireline links, optical links, wireless links, or any other devices for communication of information. Communication network 718 can be any suitable computer network, for example a wide area network such as the Internet, and/or a local area network such as Ethernet. The communication network can be wired and/or wireless, and the communication network can use encryption and decryption methods, such as is available with a virtual private network. The communication network uses one or more communications interfaces, which can receive data from, and transmit data to, other systems. Embodiments of communications interfaces typically include an Ethernet card, a modem (e.g., telephone, satellite, cable, or ISDN), (asynchronous) digital subscriber line (DSL) unit, Firewire interface, USB interface, and the like. One or more communications protocols can be used, such as HTTP, TCP/IP, RTP/RTSP, IPX and/or UDP.

User interface input devices 722 may include an alphanumeric keyboard, a keypad, pointing devices such as a mouse, trackball, touchpad, stylus, or graphics tablet, a scanner, a touchscreen incorporated into the display, audio input devices such as voice recognition systems or microphones, eye-gaze recognition, brainwave pattern recognition, and other types of input devices. Such devices can be connected by wire or wirelessly to a computer system. In general, use of the term "input device" is intended to include all possible types of devices and ways to input information into computer system 710 or onto communication network 718. User interface input devices typically allow a user to select objects, icons, text and the like that appear on some types of user interface output devices, for example, a display subsystem.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other device for creating a visible image such as a virtual reality system. The display subsystem may also provide non-visual display such as via audio output or tactile output (e.g., vibrations) devices. In general, use of the term "output device" is intended to include all possible types of devices and ways to output information from computer system 710 to the user or to another machine or computer system.

Memory subsystem 726 typically includes a number of memories including a main random-access memory (RAM) 730 (or other volatile storage device) for storage of instructions and data during program execution and a read only memory (ROM) 732 in which fixed instructions are stored. File storage subsystem 728 provides persistent storage for program and data files, and may include a hard disk drive, a floppy disk drive along with associated removable media, a CD-ROM drive, an optical drive, a flash memory, or removable media cartridges. The databases and modules implementing the functionality of certain embodiments may be stored by file storage subsystem 728.

Bus subsystem 712 provides a device for letting the various components and subsystems of computer system 710 communicate with each other as intended. Although bus subsystem 712 is shown schematically as a single bus, alternative embodiments of the bus subsystem may use multiple busses. For example, RAM-based main memory can communicate directly with file storage systems using Direct Memory Access (DMA) systems.

FIG. 7B depicts a memory 740 such as a non-transitory, computer readable data and information storage medium associated with file storage subsystem 728, and/or with network interface subsystem 716, and can include a data structure specifying a circuit design. The memory 740 can be a hard disk, a floppy disk, a CD-ROM, an optical medium, removable media cartridge, or other medium that stores computer readable data in a volatile or non-volatile form. Software read into a computer from such a memory can be converted at a selected instance in time from a tangible form to a transmission signal that is propagated through a medium (such as a network, connector, wire, or trace as an electrical pulse or a medium such as space or an atmosphere as electromagnetic radiation with wavelengths in the electromagnetic spectrum longer than infrared light).

FIG. 7C signifies an integrated circuit 790 created with the described technology that includes one or more cells selected, for example, from a cell library.

Emulation Environment Explanation

Figure 8:
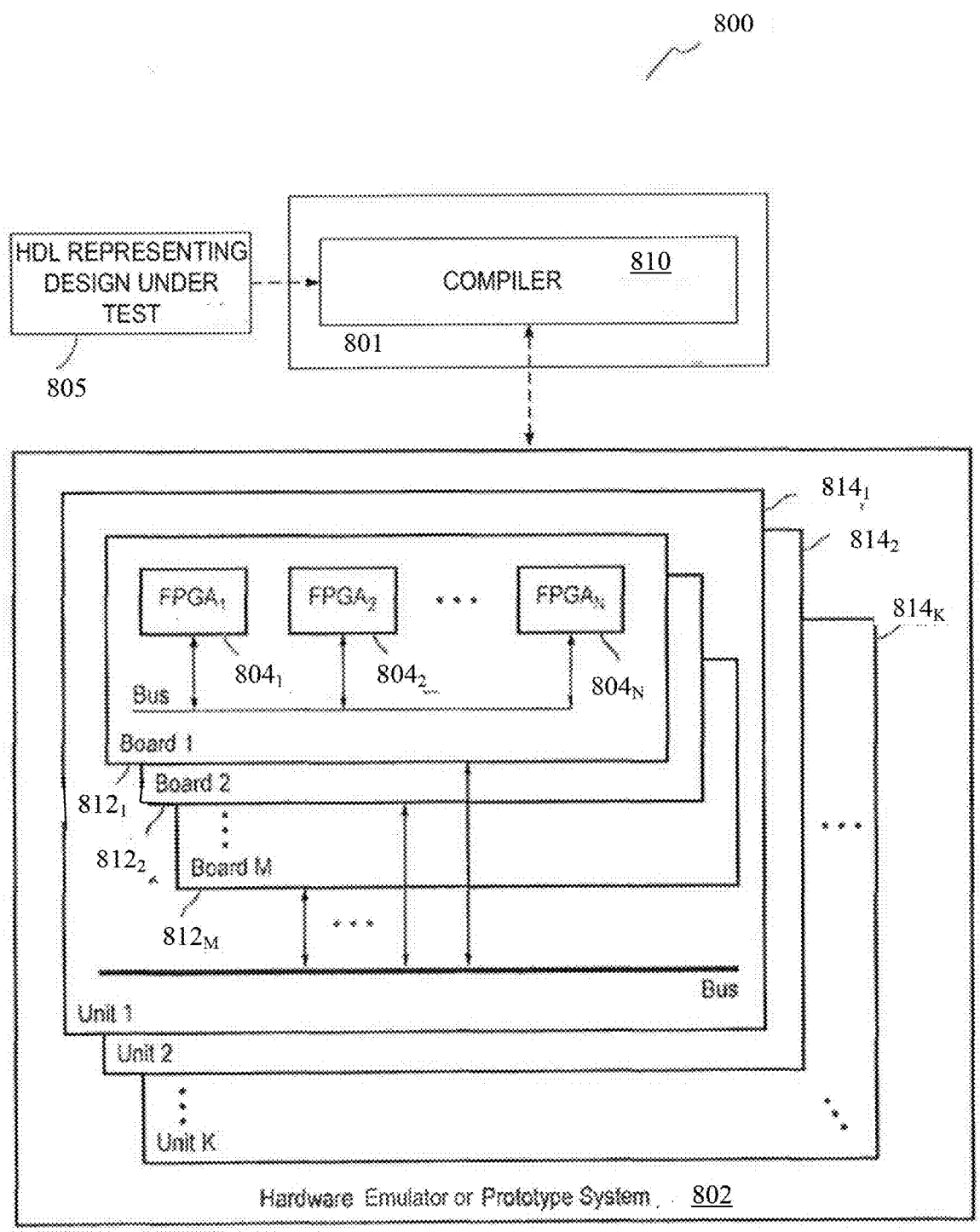
FIG. 8 depicts a block diagram of an emulation system.

An EDA software system, such as element 112 depicted in FIG. 1 typically includes an emulation system 116 to verify the functionality of the circuit design. FIG. 8 depicts a typical emulation system which includes a host computer system 801 (often part of an EDA system) and an emulator system 802 (typically a set of programmable devices such as Field Programmable Gate Arrays (FPGAs)). The host system generates data and information, typically using a compiler 810, to configure the emulator to emulate a circuit design. One of more circuit designs to be emulated are referred to as a DUT (Design Under Test). The emulator is a hardware system that emulates a DUT, for example, to use the emulation results for verifying the functionality of the DUT. One example of an emulation system that can be used for the embodiments disclosed herein is the ZeBus Server available from Synopsys, Inc.

The host system 801 comprises one or more processors. In the embodiment where the host system is comprised of multiple processors, the functions described herein as being performed by the host system may be distributed among the multiple processors.

The host system 801 typically includes a compiler 810 that processes code written in a hardware description language that represents a DUT, producing data (typically binary) and information that is used to configure the emulation system 802 to emulate the DUT. The compiler 810 may transform, change, reconfigure, add new functions to, and/or control the timing of the DUT.

The host system and emulator exchange data and information using signals carried by an emulation connection. The connection can be one or more electrical cables, for example, cables with pin configurations compatible with the RS232 or USB protocols. The connection can be a wired communication medium or network, such as a local area network, or a wide area network such as the Internet. The connection can be a wireless communication medium or a network with one or more points of access, using a wireless protocol such as Bluetooth.RTM. or IEEE 802.11. The host system and emulator can exchange data and information through a third device, such as a network server.

The emulator includes multiple FPGAs (or other programmable devices), for example, elements $804_1$ to $804_N$ in FIG. 8. Each FPGA can include one or more FPGA interfaces through which the FPGA is connected to other FPGAs of the emulator (and potentially other emulator hardware components), in order for the FPGAs to exchange signals. An FPGA interface may also be referred to as an input/output pin or an FPGA pad. While some embodiments disclosed herein make use of emulators comprising FPGAs, other embodiments can include other types of logic blocks instead of, or along with, the FPGAs for emulating DUTs, for example, custom FPGAs, specialized ASICs for emulation or prototyping, memories, and input/output devices.

A programmable device may include an array of programmable logic blocks and a hierarchy of reconfigurable interconnects that allow the programmable logic blocks to be connected to each other according to the descriptions in the HDL code. Each of the programmable logic blocks can be configured to perform complex combinational functions, or merely simple logic gates, such as AND, and XOR logic blocks.

In many FPGAs, logic blocks also include memory elements, which may be simple latches, flip-flops or more complex blocks of memory. Depending on the length of the interconnections between different logic blocks, signals may arrive at input terminals of the logic blocks at different times.

Programmable processors $804_1$-$804_N$ may be placed into one or more hardware boards $812_1$ through $812_M$. Many of such boards may be placed into a hardware unit, e.g. $814_1$. The boards within a unit may be connected using the backplane of the unit or any other types of connections. In addition, multiple hardware units (e.g., $814_1$ through $814_K$) may be connected to each other by cables or any other means to form a multi-unit system. In general, the hardware emulation or prototype system 802 may be formed using a single board, a single unit with multiple boards, or with multiple units without departing from the teachings of the present disclosure.

For a DUT that is to be emulated, the emulator receives from the host system one or more bit files including a description of the DUT. The bit files further specify partitions of the DUT created by the host system with trace and injection logic, mappings of the partitions to the FPGAs of the emulator, and design constraints. Based on the bit files, the emulator configures the FPGAs to perform the functions of the DUT. With some emulators, one or more FPGAs of an emulator already have the trace and injection logic built into the silicon of the FPGA. For this type of emulator, the FPGAs don't have to be configured by the host system to emulate trace and injection logic.

The host system 801 receives (e.g., from a user) a description of a DUT that is to be emulated. In one embodiment, the DUT description is in a hardware description language (HDL), such as register transfer language (RTL). In another embodiment, the DUT description is in netlist level files, or a mix of netlist level files and HDL files. If part of the DUT description or the entire DUT description is in a HDL, the host system synthesizes the DUT description to create a gate level netlist based on the DUT description. A host system can use the netlist of the DUT to partition the DUT into multiple partitions, with some of these partitions including trace and injection logic. The trace and injection logic traces interface signals exchanged via the interfaces of an FPGA. Additionally, the trace and injection logic can be used to inject traced interface signals into the logic of the FPGA. The host system maps each partition to an FPGA of the emulator. With some emulators, the trace and injection logic is only included in select partitions for a group of FPGAs. The trace and injection logic can be built into one or more of the FPGAs of an emulator. The host system can synthesize multiplexers to be mapped into the FPGAs. The multiplexers can be used by the trace and injection logic to inject interface signals into the DUT logic.

The host system creates bit files describing each partition of the DUT and the mapping of the partitions to the FPGAs. For partitions in which trace and injection logic was incorporated, the bit files also describe the incorporation of the logic. The bit files may also include place and route information and design constraints. The host system stores the bit files and also stores for components of the DUT information describing which FPGAs are to emulate each component of the DUT (to which FPGAs each component is mapped).

Upon request, the host system transmits the bit files to the emulator. The host system instructs the emulator to emulate the DUT. During emulation of the DUT or at the end of the emulation, the host system receives emulation results from the emulator through the emulation connection. Emulation results are data and information generated by the emulator based on the emulation of the DUT. The emulation results include interface signals (states of interface signals) traced by the trace and injection logic of each FPGA. The host system can stores the emulation results, or transmit them to another processing system.

After emulation of the DUT, a user may request to debug a component of the DUT. If such a request is made the user may provide a time period of the emulation to debug. The host system identifies which FPGAs are configured to emulate the component based on the stored information. The host system retrieves stored interface signals associated with the time period and traced by the trace and injection logic of each identified FPGA. The host system instructs the emulator to re-emulate the identified FPGAs, either one by one, multiple at a time, or altogether. The host system transmits the retrieved interface signals to the emulator in order to re-emulate the component for the time period. The trace and injection logic of each identified FPGA injects its respective interface signals received from the host system into the logic of the DUT mapped to the FPGA. In case of multiple re-emulations of an FPGA, the results may be merged all together to have a full debug view.

The host system receives from the emulator signals traced by logic of the identified FPGAs during the re-emulation of the component. The host system stores the signals received from the emulator. The signals traced during the re-emulation can have a higher sampling rate than during the initial emulation. For example, in the initial run a traced signal may be comprised of a saved hardware state every X milliseconds. However, in the re-emulation the traced signal may be comprised of a saved hardware state every Y milliseconds, where Y is less than X. If the user requests to view a waveform of a signal traced during the re-emulation, the host system can retrieve the stored signal and display a plot of the signal (generates a waveform of the signal). Afterwards the user can, for example, request to re-emulate the same component but for a different time period or to re-emulate another component.

A host system typically comprises at least seven subsystems: a design synthesizer, a mapping module, a run time module, a results module, a debug module, a waveform module, and a storage module. Each of these sub-systems may be embodied as hardware, software, firmware, or a combination thereof. Together these components configure the emulator, and monitor the emulation results.

The design synthesizer converts the HDL of a DUT into gate level logic. For a DUT that is to be emulated, the design synthesizer receives a description of the DUT. If the description of the DUT is fully or partially in HDL (e.g., RTL or other level of abstraction), the design synthesizer 810 synthesizes the HDL of the DUT to create a gate-level netlist with a description of the DUT in terms of gate level logic.

The mapping module partitions DUTs and maps partitions to emulator FPGAs. The mapping module partitions a DUT at the gate level into a number of partitions using the netlist of the DUT. For each partition, the mapping module retrieves a gate level description of the trace and injection logic and incorporates the logic into the partition. As described above, the trace and injection logic included in a partition is configured to trace signals exchanged via the interfaces of an FPGA to which the partition is mapped (trace interface signals). The trace and injection logic can be incorporated into the DUT prior to the partitioning. For example, the trace and injection logic may be incorporated by the design synthesizer prior to or after the synthesizing the HDL of the DUT. Hence, the trace and injection logic may not match the partitions, it may be a subset, a superset or even different from the partitions.

In addition to including the trace and injection logic, the mapping module may include additional tracing logic in a partition in order to trace the states of certain DUT components that are not traced by the trace and injection logic (to trace signals other than the interface signals traced by the trace and injection logic). The mapping module may include the additional tracing logic in the DUT prior to the partitioning or in partitions after the partitioning. The design synthesizer can include the additional tracing logic in an HDL description of the DUT prior to synthesizing the description.

The mapping module maps each partition of the DUT to an FPGA of the emulator. The mapping module performs the partitioning and mapping using design rules, design constraints (e.g., timing or logic constraints), and information about the emulator. For components of the DUT, the mapping module stores information in the storage module describing which FPGAs are to emulate each component.

Based on the partitioning and the mapping, the mapping module generates one or more bit files that describe the created partitions and the mapping of logic to each FPGA of the emulator. The bit files may include additional information, such as constraints of the DUT, and routing information of connections between FPGAs and connections within each FPGA. The mapping module can generate a bit file for each partition of the DUT, which can be stored in the storage module. Upon request from a user, the mapping module transmits the bit files to the emulator, which the emulator uses to configure the FPGAs to emulate the DUT.

If the emulator includes specialized ASICs that include the trace and injection logic, the mapping module may generate a specific configuration allowing to connect them to the DUT or just save the information of what traced/injected signal is and where the information is stored on the specialized ASIC.

The run time module controls emulations performed on the emulator. The run time module may cause the emulator to start or stop executing an emulation. Additionally, the run time module may provide input signals/data to the emulator. The input signals may be provided directly to the emulator through the connection or indirectly through other input signal devices. For example, the host system with the run time module may control an input signal device to provide the input signals to the emulator. The input signal device may be, for example, a test board (directly or through cables), signal generator, another emulator, or another host system.

The results module processes emulation results generated by the emulator. During emulation and/or after completing the emulation, the results module receives emulation results from the emulator generated during the emulation. The emulation results include signals traced during the emulation. Specifically, the emulation results include interface signals traced by the trace and injection logic emulated by each FPGA. The emulation results may also include signals traced by additional logic included in the DUT. Each traced signal can span multiple cycles of the emulation. A traced signal is comprised of multiple hardware states and each hardware state is associated with a time of the emulation. The results module stores the traced signals received in the storage module. For each stored signal, the results module can store information indicating which FPGA generated the traced signal.

The debug module allows users to debug DUT components. After the emulator has emulated a DUT and the results module has received the interface signals traced by the trace and injection logic during the emulation, a user may request to debug a component of the DUT by re-emulating the component for a specific time period. In a request to debug a component, the user identifies the component and indicates a time period of the emulation to debug. The user's request can also include a sampling rate that indicates how often hardware states should be saved by logic that traces signals.

The debug module identifies the one or more FPGAs of the emulator that are configured to emulate the component based on the information stored by the mapping module in the storage module. For each identified FPGA, the debug module retrieves, from the storage module, interface signals traced by the trace and injection logic of the FPGA during the time period indicated by the user (i.e., retrieve hardware states traced by the trace and injection logic that are associated with the time period).

The debug module transmits the retrieved interface signals to the emulator. The debug module instructs the debug module to run the identified FPGAs and for the trace and injection logic of each identified FPGA to inject its respective traced signals into logic of the FPGA in order to re-emulate the component for the requested time period. The debug module can also transmit the sampling rate provided by the user to the emulator so that the tracing logic traces hardware states at the proper intervals.

To debug the component, the emulator only has to run the FPGAs to which the component has been mapped. Additionally, the re-emulation of the component does not have to start from the beginning, but can start at any point desired by the user.

For an identified FPGA, the debug module can transmit instructions to the emulator to load multiple emulator FPGAs with the same configuration of the identified FPGA. The debug module additionally instructs the emulator to run the multiple FPGAs in parallel. Each FPGA from the multiple FPGAs is run with a different time window of the interface signals in order to generate a larger time window in a shorter amount of time. For example, for the identified FPGA to run a certain amount of cycles it may take an hour. However, if multiple FPGAs are loaded with the configuration of the identified FPGA and each of the FPGAs runs a subset of the cycles, it may only take a few minutes for the FPGAs to collectively run all of the cycles.

A user may identify a hierarchy or a list of DUT signals to re-emulate. To enable this, the debug module determines the FPGA needed to emulate the hierarchy or list of signals, retrieves the necessary interface signals and transmits the retrieved interface signals to the emulator for re-emulation. Hence, a user can identify any element (e.g., component or signal) of the DUT to debug/reemulate.

The waveform module generates waveforms based on traced signals. If a user requests to view a waveform of a signal traced during an emulation run, the host system retrieves the signal from the storage module. The waveform module displays a plot of the signal to the user. For one or more signals, when the signals are received from the emulator, the waveform module can automatically generate the plots of the signals.

Hardware/Software Equivalence

Some of the innovations, embodiments and/or examples described herein comprise and/or use a processor. As used herein, the term 'processor' signifies a tangible data and information processing device that physically transforms data and information, typically using a sequence transformations (also referred to as 'operations'). Data and information can be physically represented by an electrical, magnetic, optical or acoustical signal that is capable of being stored, accessed, transferred, combined, compared, or otherwise manipulated by the processor. The term "processor" can signify a singular processor and multi-core systems or multi-processor arrays, including graphic processing units, digital signal processors, digital processors or combinations of these elements.

The processor can be electronic, for example, comprising digital logic circuitry (for example, binary logic), or analog (for example, an operational amplifier). The processor can also be non-electronic, for example, as seen in processors based on optical signal processing, DNA transformations or quantum mechanics, or a combination of technologies, such as an optoelectronic processor. For data and information structured in binary form, any processor that can transform the data and information using the AND, OR and NOT logical operations (and their derivatives, such as the NAND, NOR, and XOR operations) can transform the data and information using any function of Boolean logic. A processor such as an analog neural network processor can also transform data and information non-digitally. There is no scientific evidence that any of these processors are processing, storing and retrieving data and information, in any manner or form equivalent to the bioelectric structure of the human brain.

The one or more processors may also operate to support performance of the relevant operations in a 'cloud computing' environment or as a 'software as a service' (SaaS). For example, at least some of the operations may be performed by a group of processors available at a distributed or remote system, these processors accessible via a communications network (e.g., the Internet) and via one or more software interfaces (e.g., an application program interface (API).)

As used herein, the term 'module' signifies a tangible data and information processing device, that typically is limited in size and/or complexity. For example, the term 'module' can signify one or more methods or procedures that can transform data and information. The term 'module' can also signify a combination of one or more methods and procedures in a computer program. The term 'module' can also signify a small network of digital logic devices, in which interconnections of the logic devices give structure to the network. Methods and procedures comprising a module, specified in a specialized language, such as System C, can be used to generate a specification for a network of digital logic devices that process data and information with exactly the same results as are obtained from the methods and procedures.

A module can be permanently configured (e.g., hardwired to form hardware), temporarily configured (e.g., programmed with software), or a combination of the two configurations (for example, a structured ASIC). Permanently configured modules can be manufactured, for example, using Application Specific Integrated Circuits (ASICs) such as Arithmetic Logic Units (ALUs), Programmable Logic Arrays (PLAs), or Read Only Memories (ROMs), all of which are typically configured during manufacturing. Temporarily configured modules can be manufactured, for example, using Field Programmable Gate Arrays (FPGAs—for example, sold by Xilinx or Intel's Altera), Random Access Memories (RAMs) or microprocessors. A module is configured to process data and information, typically using a sequence transformations (also referred to as 'operations') applied to the data and information (or in the case of ROMs and RAMS, transforming data and information by using the input information as an address for memory that stores output data and information), to perform aspects of the present innovations, embodiments and/or examples of the invention.

Modules that are temporarily configured need not be configured at any one instance in time. For example, a processor comprising one or more modules can have the modules configured at different times. The processor can comprise a set of one or more modules at one instance of time, and to comprise a different set of one or modules at a different instance of time. The decision to manufacture or implement a module in a permanently configured form, a temporarily configured form, or a combination of the two forms, may be driven by cost, time considerations, engineering constraints and/or specific design goals. The "substance" of a module's processing is independent of the form in which it is manufactured or implemented.

As used herein, the term 'algorithm' signifies a process comprising a sequence or set of operations or instructions that a module can use to transform data and information to achieve a result. A module can comprise one or more algorithms. As used herein, the term 'thread' refers to a sequence of instructions that can comprise a subset of the instructions of an entire process or algorithm. A process or algorithm can be partitioned into multiple threads that can be executed in parallel.

As used herein, the term 'computer' includes at least one information processor that, for example, can perform certain operations such as (but not limited to) the AND, OR and NOT logical operations using electronic gates that can comprise transistors, with the addition of memory (for example, memory based on flip-flops using the NOT-AND or NOT-OR operation). Such a processor is said to be Turing-complete or computationally universal. A computer, whether or not it is a digital computer, typically comprises many modules.

As used herein, the term 'software' or 'program' signifies one or more algorithms and data structures that configure a processor for use in the innovations, embodiments and examples described in this specification. Such devices configurable by software include one or more computers, for example, standalone, client or server computers, or one or more hardware modules, or systems of one or more such computers or modules. As used herein, the term "software application" signifies a set of data and instructions that configure the processor to achieve a specific result, for example, to perform word processing operations, or to encrypt a set of data.

As used herein, the term 'programming language' signifies a grammar and syntax for specifying sets of instruction and data that comprise software. Programming languages include assembler instructions, instruction-set-architecture (ISA) instructions, machine instructions, machine dependent instructions, microcode, firmware instructions, state-setting data, or either source code or object code written in any combination of one or more higher level languages, such as conventional procedural programming languages, for example, the "C" programming language or similar programming languages (such as SystemC), or object oriented programming language such as Smalltalk, C++ or the like, and any future equivalent programming languages.

Software is entered into, equivalently, read into, one or memories of the computer or computer system from a data and information storage device. The computer typically has a device for reading storage media that is used to transport the software, or has an interface device that receives the software over a network. This process is discussed in the General Computer Explanation section.

Semantic Support

The signifier 'commercial solution' signifies, solely for the following paragraph, an engineering domain-specific (and thus non-preemptive—see Bilski) electronic structure, process for specified machines, manufacturable circuit (and their Church-Turing equivalents) or composition of matter that is useful in commerce to solve a problem of technology, that is, a use in commerce of an application of science or use in commerce of technology.

The signifier 'abstract' (when used in a patent claim for any embodiments disclosed herein for a new commercial solution that is a scientific application of one or more laws of nature {see Benson}, and that solves a problem of technology {see Diehr} used in commerce—or improves upon an existing commercial solution {see Diehr})—is precisely defined by the inventor(s) {see MPEP 2111.01} as follows:

a) a new commercial solution is 'abstract' if it is not novel (e.g., it is so well known in equal prior art {see Alice} and/or the use of equivalent prior art solutions is long prevalent {see Bilski} in science, engineering or commerce), and thus unpatentable under 35 U.S.C. 102, for example, because it is "difficult to understand" {see Merriam-Webster definition for 'abstract'} how the commercial solution differs from equivalent prior art solutions; or b) a new commercial solution is 'abstract' if it is obvious, that is, if the existing prior art includes at least one analogous prior art solution {see KSR}, or the existing prior art includes at least two prior art items that can be combined {see Alice} by a person having ordinary skill in the art {a "PHOSITA", see MPEP 2141-2144} to be equivalent to the new commercial solution, and is thus unpatentable under 35 U.S.C. 103, for example, because it is "difficult to understand" how the new commercial solution differs from a PHOSITA-combination/-application of the existing prior art; or c) a new commercial solution is 'abstract' if it is not disclosed with an enabling description either because there is insufficient guidance in the enabling description, or because only a generic implementation is described {see Mayo} with unspecified elements, parameters or functionality, so that a PHOSITA is unable to instantiate a useful embodiment of the new commercial solution, without, for example, requiring special programming {see Katz} or circuit design to be performed by the PHOSITA), and is thus unpatentable under 35 U.S.C. 112, for example, because it is "difficult to understand" how to use in commerce any embodiment of the new commercial solution.

Conclusion

The foregoing Detailed Description signifies in isolation the individual features, structures, functions, or characteristics described herein and any combination of two or more such features, structures, functions or characteristics, to the extent that such features, structures, functions or characteristics or combinations thereof are based on the present specification as a whole in light of the knowledge of a person skilled in the art, irrespective of whether such features, structures, functions or characteristics, or combinations thereof, solve any problems disclosed herein, and without limitation to the scope of the claims. When an embodiment of a claimed invention comprises a particular feature, structure, function or characteristic, it is within the knowledge of a person skilled in the art to use such feature, structure, function, or characteristic in connection with other embodiments whether or not explicitly described, for example, as a substitute for another feature, structure, function or characteristic.

In view of the foregoing Detailed Description it will be evident to a person skilled in the art that many variations may be made within the scope of innovations, embodiments and/or examples, such as function and arrangement of elements, described herein without departing from the principles described herein. One or more elements of an embodiment may be substituted for one or more elements in another embodiment, as will be apparent to those skilled in the art. The embodiments described herein are chosen to signify the principles of the invention and its useful application, thereby enabling others skilled in the art to understand how various embodiments and variations are suited to the particular uses signified.

The foregoing Detailed Description of innovations, embodiments, and/or examples of the claimed inventions has been provided for the purposes of illustration and description. It is not intended to be exhaustive nor to limit the claimed inventions to the precise forms described, but is to be accorded the widest scope consistent with the principles and features disclosed herein. Obviously, many variations will be recognized by a person skilled in this art. Without limitation, any and all equivalents described, signified or incorporated by reference in this patent application are specifically incorporated by reference into the description herein of the innovations, embodiments and/or examples. In addition, any and all variations described, signified or incorporated by reference herein with respect to any one embodiment are also to be considered taught with respect to all other embodiments. Any such variations include both currently known variations as well as future variations, for example any element used herein includes a future equivalent element that provides the same function, regardless of the structure of the future equivalent.

It is intended that the scope of the claimed inventions be defined and judged by the following claims and equivalents. The following claims are hereby incorporated into the Detailed Description, with each claim standing on its own as a separate embodiment. Disclosed embodiments can be described with more features than are expressly recited in the claims.

What is claimed is:

1. A method for preparing an integrated circuit design for manufacture, comprising:
    receiving a prioritized layout database which identifies a preliminary layout of a circuit design, the layout including a plurality of features, and the prioritized layout database further identifying a shape accuracy importance prioritization for each feature of the plurality of features, the shape accuracy importance prioritization of each respective feature representing an importance of the respective feature being reproduced during manufacturing;
    providing the prioritized layout database for optical proximity correction (OPC) of features identified in the layout, resulting in an OPC-corrected layout database;
    determining manufacturing risks by implementing lithography rule checking using the OPC-corrected layout database;
    providing a ranking of the manufacturing risks; and
    displaying, by a graphical user interface, a subset of the manufacturing risks ranked according to the shape accuracy importance prioritizations.

2. The method of claim 1, wherein the features in the plurality of features include individual polygons.

3. The method of claim 1, wherein the features in the plurality of features include individual portions of polygons.

4. The method of claim 1, wherein the features in the plurality of features include combinations of more than one polygon.

5. The method of claim 1,
    wherein the prioritized layout database identifies features of the preliminary layout by layer and polygon descriptions, and
    wherein the prioritized layout database associates each of the polygons with a prioritization for the polygon.

6. The method of claim 1,
    wherein the prioritized layout database identifies features of the preliminary layout by polygon descriptions, each associated with a layer number field and a datatype field, and
    wherein the prioritized layout database includes in the datatype field associated with a particular one of the polygons a value identifying the particular polygon.

7. The method of claim 1, wherein the displaying comprises:
    detecting the subset of manufacturing risks in dependence upon the layout identified in the OPC-corrected layout database, each of the risks in the subset being associated with a respective set of at least one feature in the plurality of features;
    obtaining, from the OPC-corrected layout database, the shape accuracy importance prioritizations of each of the features associated with the manufacturing risks in the subset of identified manufacturing risks; and
    displaying a list of the subset of identified manufacturing risks, ranked in an order dependent upon the shape accuracy importance prioritizations of the features associated with the manufacturing risks in the subset of identified manufacturing risks.

8. The method of claim 7, wherein the displaying of the list includes, for each given one of the risks in the subset for which the associated set of at least one feature includes more than one feature, ranking the given risk in accordance with the highest prioritization of all features in the set.

9. The method of claim 7, wherein the set of features associated with a given one of the risks in the subset includes more than one feature, and wherein the method further includes displaying an illustration of at least a portion of the layout that includes the features of the set, with each of the features of the set highlighted differently in accordance with their respective shape accuracy importance prioritizations.

10. The method of claim 9,
    wherein the set of features associated with a given one of the risks in the subset includes more than one feature, and
    wherein the method further comprises revising the OPC-corrected layout database to reduce certain ones of the manufacturing risks by implementing operations comprising:

assigning weights to each of the features in the set in dependence upon the respective shape accuracy importance prioritizations of the features; and modifying shapes of the features in the set in dependence upon a cost function incorporating the weights.

11. The method of claim 1, wherein the providing of the prioritized layout database comprises:

obtaining the prioritizations from the prioritized layout database; and performing the optical proximity correction in dependence upon the prioritizations.

12. The method of claim 1, further comprising taping out a revised OPC-corrected layout database, the revised OPC-corrected layout database being obtained by revising the OPC-corrected layout database to reduce certain ones of the manufacturing risks at an expense of increasing other ones of the manufacturing risks, in dependence upon the shape accuracy importance prioritizations.

13. The method of claim 1, further comprising:

a computer system preparing the preliminary layout;

developing the shape accuracy importance prioritizations among the features; and writing the preliminary layout and the shape accuracy importance prioritizations into the prioritized layout database.

14. The method of claim 13, wherein the developing of the shape accuracy importance prioritizations among the features comprises:

developing a shape accuracy importance prioritization for a feature that includes a plurality of polygons; and a computer system applying the shape accuracy importance prioritization for the feature to each of the polygons in the plurality of polygons.

15. The method of claim 14, wherein the developing of the shape accuracy importance prioritizations among the features further comprises a user manually modifying the shape accuracy importance prioritization applied to one of the polygons by a computer system.

16. The method of claim 14, wherein the prioritized layout database identifies features of the preliminary layout by polygon descriptions, each associated with a layer number field and a datatype field, and wherein the writing of the shape accuracy importance prioritizations into the prioritized layout database includes writing into the datatype field of a particular one of the polygons a value representing a shape accuracy importance prioritization for the particular polygon.

17. A non-transitory computer-readable recording medium having computer instructions recorded thereon for preparing an integrated circuit design for manufacture, the computer instructions, when executed on one or more processors, causing the one or more processors to implement operations comprising:

preparing a preliminary layout to implement a circuit design, the layout identifying a plurality of features;

developing a shape accuracy importance prioritization for each feature of the plurality of features, the shape accuracy importance prioritization of each respective feature representing an importance of the respective feature being reproduced during manufacturing;

writing the preliminary layout and the shape accuracy importance prioritizations into a prioritized layout database which includes an identification of the shape accuracy importance prioritizations;

providing the prioritized layout database for optical proximity correction (OPC) of features identified in the layout, resulting in an OPC-corrected layout database;

determining manufacturing risks by implementing lithography rule checking using the OPC-corrected layout database;

providing a ranking of the manufacturing risks; and displaying, by a graphical user interface, a subset of the manufacturing risks ranked according to the shape accuracy importance prioritizations.

18. The non-transitory computer-readable recording medium of claim 17, wherein the operations further comprise taping out a revised OPC-corrected layout database, the revised OPC-corrected layout database being obtained by revising the OPC-corrected layout database to reduce certain ones of the manufacturing risks at an expense of increasing other ones of the manufacturing risks, in dependence upon the shape accuracy importance prioritizations.

19. The non-transitory computer-readable recording medium of claim 17, wherein the operations further comprise sending the revised OPC-corrected layout database to an integrated circuit manufacturing facility.

20. A system comprising:

a memory storing instructions to prepare an integrated circuit design for manufacture; and a processor, coupled with the memory and to execute the instructions, the instructions, when executed, causing the processor to:

receive a prioritized layout database which identifies a preliminary layout of a circuit design, the layout including a plurality of features, and the prioritized layout database further identifying a shape accuracy importance prioritization for each feature of the plurality of features, the shape accuracy importance prioritization of each respective feature representing an importance of the respective feature being reproduced during manufacturing;

provide the prioritized layout database for optical proximity correction (OPC) of features identified in the layout, resulting in an OPC-corrected layout database;

determining manufacturing risks by implementing lithography rule checking using the OPC-corrected layout database;

providing a ranking of the manufacturing risks; and displaying, by a graphical user interface, a subset of the manufacturing risks ranked according to the shape accuracy importance prioritizations.

* * * * *